US009038236B2

(12) United States Patent
Fry et al.

(10) Patent No.: US 9,038,236 B2
(45) Date of Patent: May 26, 2015

(54) FILTER SHAKER (75) Inventors: Kevin D. Fry, South Williamsport, PA (US); Robert L. Crevling, Jr., Williamsport, PA (US); Randy L. Buss, Muncy, PA (US)

(73) Assignee: SHOP VAC CORPORATION, Williamsport, PA (US)

( * ) Notice: Subject to any disclaimer, the term of this patent is extended or adjusted under 35 U.S.C. 154(b) by 641 days.

(21) Appl. No.: 13/455,738

(22) Filed: Apr. 25, 2012

(65) Prior Publication Data
US 2013/0283563 A1 Oct. 31, 2013

(51) Int. Cl.
*A47L 9/20* (2006.01)
*B01D 46/00* (2006.01)

(52) U.S. Cl.
CPC ........ *B01D 46/0075* (2013.01); *B01D 2279/55* (2013.01)

(58) Field of Classification Search
CPC ... A47L 9/20; B01D 46/0075; B01D 2279/55
USPC .......................................................... 15/352
See application file for complete search history.

(56) References Cited

U.S. PATENT DOCUMENTS

| 2,437,034 | A | 3/1948 | Meinzer |
| 2,543,342 | A | 2/1951 | Timm |
| 2,585,508 | A | 2/1952 | Smellie |
| 3,160,908 | A | 12/1964 | Krier |
| 3,591,888 | A | 7/1971 | Takeda et al. |
| 3,639,940 | A | 2/1972 | Carlson et al. |
| 3,653,189 | A | 4/1972 | Miyake et al. |
| 3,877,901 | A | 4/1975 | Snyder |
| 3,938,971 | A | 2/1976 | McClure |
| 3,951,628 | A | 4/1976 | Eskijian |
| 4,099,940 | A | 7/1978 | Mortensen et al. |
| 4,258,451 | A | 3/1981 | Sommerfeld |

(Continued)

FOREIGN PATENT DOCUMENTS

| EP | 0024636 A1 | 3/1981 |
| EP | 1834565 A1 | 9/2007 |

(Continued)

OTHER PUBLICATIONS

European Search Report, European patent application No. EP12196061, May 27, 2013.

(Continued)

*Primary Examiner* — David Redding
(74) *Attorney, Agent, or Firm* — Marshall, Gerstein & Borun LLP (57) ABSTRACT

A filter shaker for a filter assembly disposed in a vacuum includes a housing that removably mounts to the filter and/or a support for the filter and a vibrator assembly carried by the housing. When actuated, the vibrator assembly vibrates the filter to clean particulate matter from the filter. The vibrator assembly includes a motor that drives an eccentric and an actuator that periodically impacts against a portion of the housing to cause the vibrations. The housing includes a mounting assembly for mounting the filter shaker to the cage and/or filter in an operative position and a locking assembly for locking and unlocking the filter shaker in the operative position to prevent the filter shaker from vibrating off. In the operative position, the filter shaker covers an open end of a tubular filter and thereby forces air to be directed through filter material of the tubular filter.

20 Claims, 6 Drawing Sheets

(56) References Cited

U.S. PATENT DOCUMENTS

| | | | |
|---|---|---|---|
| 4,289,630 A | 9/1981 | Schmidt, Jr. et al. |
| 4,297,114 A | 10/1981 | Hutchins |
| 4,328,014 A | 5/1982 | Burgoon et al. |
| 4,345,353 A | 8/1982 | Sommerfeld |
| 4,510,815 A | 4/1985 | Baumers et al. |
| 4,533,371 A | 8/1985 | Nakamura |
| 4,557,738 A | 12/1985 | Menasian |
| 4,580,313 A | 4/1986 | Blehert |
| 4,592,764 A | 6/1986 | Ikezaki et al. |
| 4,675,032 A | 6/1987 | Genovese et al. |
| 4,704,144 A | 11/1987 | LeBlanc et al. |
| 4,787,923 A | 11/1988 | Fleigle et al. |
| 4,792,344 A | 12/1988 | Belcher et al. |
| 4,868,949 A | 9/1989 | Loveless et al. |
| 5,013,333 A | 5/1991 | Beaufoy et al. |
| 5,087,274 A | 2/1992 | Poor et al. |
| 5,090,083 A | 2/1992 | Wulff |
| 5,152,027 A | 10/1992 | La Boda |
| 5,194,077 A | 3/1993 | Bargiel et al. |
| 5,223,005 A | 6/1993 | Avondoglio |
| 5,259,087 A | 11/1993 | Loveless et al. |
| 5,603,740 A | 2/1997 | Roy |
| 5,647,093 A | 7/1997 | Engel et al. |
| 5,667,682 A | 9/1997 | Laird |
| 5,681,363 A | 10/1997 | Tucker et al. |
| 5,690,710 A | 11/1997 | Stephan |
| 5,704,956 A | 1/1998 | Loveless et al. |
| 5,711,775 A | 1/1998 | Field et al. |
| 5,829,094 A | 11/1998 | Field et al. |
| 6,117,200 A | 9/2000 | Berg et al. |
| 6,192,550 B1 | 2/2001 | Hamada et al. |
| 6,202,765 B1 | 3/2001 | Schaffer et al. |
| 6,471,751 B1 | 10/2002 | Semanderes et al. |
| 6,569,218 B2 | 5/2003 | Dudley |
| 6,598,263 B2 | 7/2003 | Boles et al. |
| 6,638,329 B2 | 10/2003 | Gerold |
| 6,854,157 B2 | 2/2005 | Strauser |
| 6,949,130 B1 | 9/2005 | Grey et al. |
| 7,485,167 B2 | 2/2009 | Kennedy |
| 7,896,936 B2 | 3/2011 | Adelman et al. |
| 8,012,225 B2 | 9/2011 | Pineschi |
| 8,256,061 B2 | 9/2012 | Wilmo et al. |
| 8,327,487 B2 | 12/2012 | Kunz et al. |
| 2004/0025287 A1 * | 2/2004 | McCormick et al. ........... 15/353 |
| 2005/0091784 A1 | 5/2005 | Bone |
| 2007/0000219 A1 | 1/2007 | Park et al. |
| 2007/0209148 A1 | 9/2007 | Yacobi et al. |
| 2008/0271420 A1 * | 11/2008 | Wellens et al. ............... 55/337 |
| 2009/0217479 A1 | 9/2009 | Wilmo et al. |
| 2012/0117927 A1 | 5/2012 | Oh et al. |

FOREIGN PATENT DOCUMENTS

| | | |
|---|---|---|
| EP | 2085012 A1 | 8/2009 |
| GB | 2055617 A | 3/1981 |
| JP | 2011055975 A | 3/2011 |
| WO | WO-2011/010786 A1 | 1/2011 |
| WO | WO-2012/017606 A1 | 2/2012 |

OTHER PUBLICATIONS

Automatic Shake Telecontrol Dry Model product brochure, Soteco SpA (date not available).

Filter Shaker List from Alto® Operator's Manual, American-Lincoln Technology (1995).

Illustration of Hose Carrier Design, Shop Vac Corporation, applicant's internal files (Mar. 13, 1997).

Love-Less AshVac system product sheet (date not available).

* cited by examiner

FILTER SHAKER

BACKGROUND

1. Field of the Invention

The present application relates generally to a filter shaker for a filter assembly, a filter assembly having a filter shaker, and a vacuum having the filter assembly and filter shaker.

2. Description of the Background

A tank vacuum, such as some well known wet-dry vacuums, often includes a tank defining a vacuum chamber, a lid covering an opening into a top end of the vacuum chamber, an air inlet to which a hose or other accessory may be attached, an air outlet through the lid, a vacuum pump arranged to force air flow from inside the vacuum chamber out through the air outlet, and a filter carried by a cage extending downwardly from the lid. The filter is in the form of an elongate tube of filter material, such as pleated or un-pleated filter paper or other mesh, forming a tubular wall surrounding an axial bore having opposite open ends aligned along an axis. The filter fits around the cage with a top open end of the bore in air-flow communication with the air outlet and may have a sealed cap at a bottom end of the bore or an open bottom end of the bore may be plugged with a filter retainer that acts to both help retain the filter on the cage and prevent debris from flowing through the open bottom end into the bore of the filter without being forced through the filter material. In some designs, the filter is simply held to the cage by friction between the cage and a gasket built into the filter. The bottom end of the filter and the filter retainer are often suspended spaced above a bottom or floor of the vacuum chamber. This feature allows a substantial amount of debris and other material to collect at the bottom of the vacuum chamber without surrounding and clogging the air pathways through the filter.

Such vacuums are frequently used for cleaning small to mid-sized debris, wet and dry debris, and/or for collecting liquids in home workshops and garages, industrial and manufacturing areas, and the like. Often, the filter is designed to be removable from the cage by, for example, removing the filter retainer from the cage and sliding the filter off the distal or bottom end of the cage. This design feature is useful for changing the filter or removing the filter while, for example, collecting water or other liquids with the tank vacuum.

Frequently, the filter of the tank vacuum can become clogged with debris of varying sizes. A clogged filter can restrict air flow though the filter and thereby limit the efficiency and/or efficacy of the vacuum and/or overwork the vacuum pump motor and cause premature failure of the vacuum pump motor. In the known tank vacuum described above, the debris could be cleaned by removing the filter retainer and the filter from the filter cage, and then cleaning the debris from the filter by, for example, repeatedly knocking the filter against something. However, this process of cleaning a filter can be cumbersome, inconvenient, and may result in dust or debris be spread outside the tank when the filter is removed.

In view of the circumstances described above, the present inventors have developed a filter shaker that may be used with a filter assembly for a vacuum that, in some arrangements, is believed to provide certain benefits and advantages not previously available from filter shakers known heretofore.

SUMMARY

According to one aspect of the application, a filter shaker includes a motor, an eccentric connected to motor shaft, and an actuator connected to the eccentric. The motor, eccentric, and actuator are carried by a housing. The actuator is arranged to periodically impact a portion of the housing. A connector carried by the housing is arranged to releasably mount the filter shaker across an end of a filter.

According to a further aspect, a vacuum includes a vacuum housing defining a vacuum chamber, a vacuum pump carried by the vacuum housing, a filter extending into the vacuum chamber, a cage supporting the filter shaker, and a filter shaker carried by the filter and/or the cage. The filter shaker includes a housing, a vibrator assembly carried by the housing, and a connector. The filter shaker is releasably mount the filter and/or the cage by the connector. Optionally, the filter shaker may include a lock arranged to selectively and releasably lock the filter shaker to the filter and/or the cage.

According to another aspect, a filter assembly includes an elongate tubular filter, a cage supporting the filter, and a filter shaker releasably secured to the cage and covering an open into a bore of the filter in a mounted position.

Other aspects will become apparent upon consideration of the following detailed description.

DETAILED DESCRIPTION

Turning now to FIGS. 1-4, a vacuum 10, such as an exemplary wet-dry tank vacuum, according to principles of the disclosure includes a vacuum housing 12 defining a vacuum chamber 14, a vacuum pump 16 arranged to evacuate air from the vacuum chamber, and a filter assembly 18 that prevents particulates inside the vacuum chamber from being drawn into the vacuum pump. The filter assembly 18 includes a filter 20, a cage 22 that supports the filter, and a filter shaker 24 carried by the cage in the operative position. As explained in greater detail hereafter, the filter shaker 24 is adapted to shake the cage 22 and/or the filter 20 when selectively activated to shake particulates, such as dust and debris, from the filter, which may otherwise accumulate on the filter during use and clog the filter or otherwise hinder optimum performance of the vacuum. The filter shaker 24 preferably includes a mounting assembly 26 that is arranged to releasably mount the filter shaker to the filter 20 and/or the cage 22 and/or to a cap removably or permanently attached to the filter 20 and/or the cage 22, in an operative position, and optionally a locking assembly 28 that is arranged to lock the filter shaker in the position until unlocked.

The vacuum housing 12 preferably is in the form of a tank that includes an upright tank bottom 30, such as a generally cylindrical canister, and a cover 32, such as a generally circular lid, that removably covers an opening 34 into a top end of the vacuum chamber 14. The tank bottom 30 and the cover 32 define the vacuum chamber 14, an air inlet 36 into the vacuum chamber 14, and an air outlet 38 out of the vacuum chamber. Optionally, one or more stabilization members 40, such as coasters, legs, and/or feet, are disposed at a bottom end of the bottom portion. The stabilization members 40 are preferably arranged to facilitate maintaining the vacuum 10 in an upright position, i.e., with the air outlet 38 and the filter 20 disposed in an upper portion of the vacuum chamber 14 above a floor 42 of the vacuum chamber. However, the vacuum housing 12 is not limited to the form disclosed and may have any form capable of forming the vacuum chamber 14 in accordance with the principles of the application. The vacuum housing 12 may include additional features, such as handles 44, clips 46 to releasably mount the cover 32 to the tank bottom 30 covering the opening 34, a pump housing 48 to cover the vacuum pump 16, air grates 50a partly covering a cooling air inlet and air grates 50b partly covering a cooling air outlet that cooperate to provide cooling air to a motor of the vacuum pump 16, and other features as would be well understood in the art.

Figure 1:
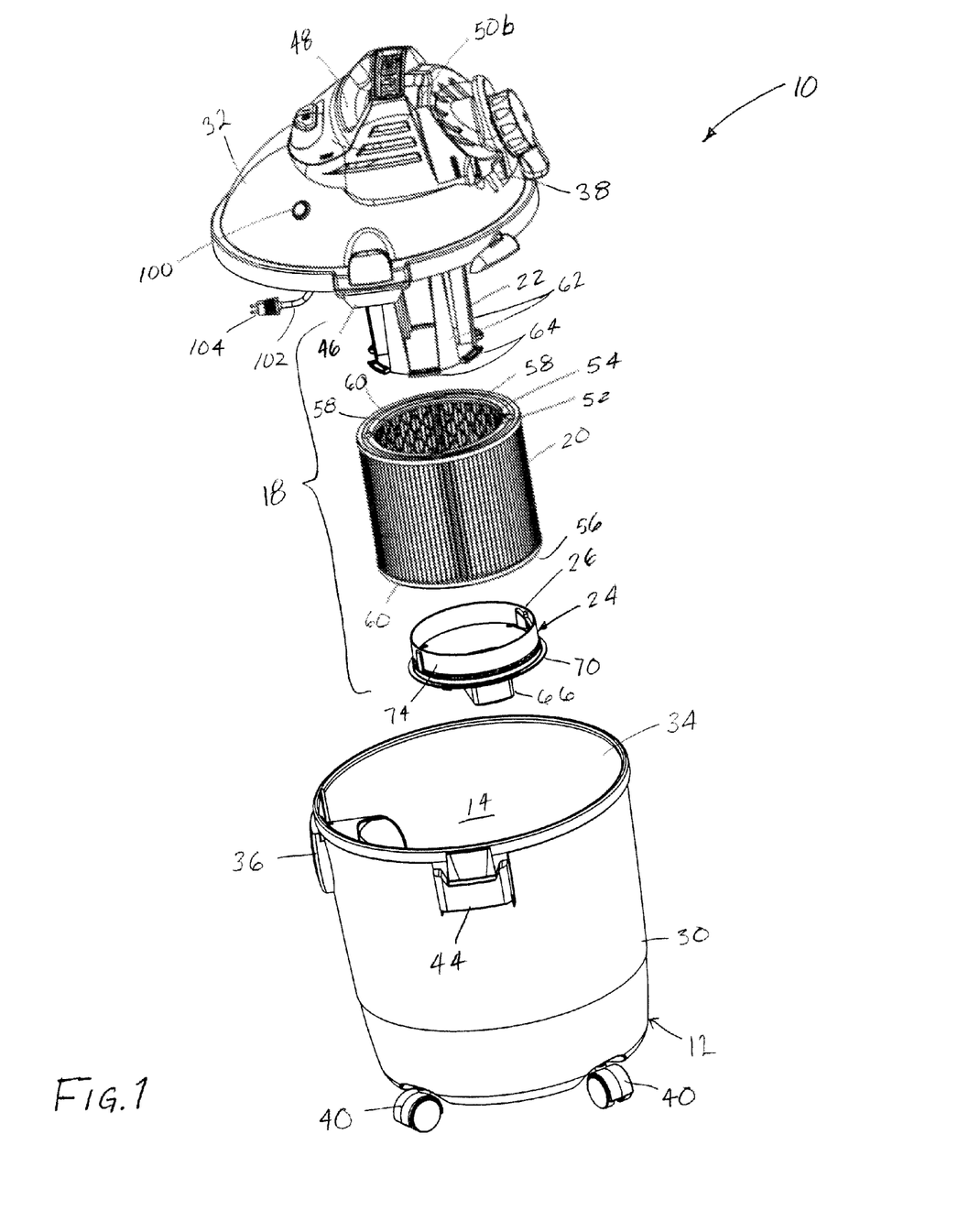
FIG. 1 is an exploded side view of a vacuum having a filter assembly and a filter shaker of the present disclosure.
Figure 2:
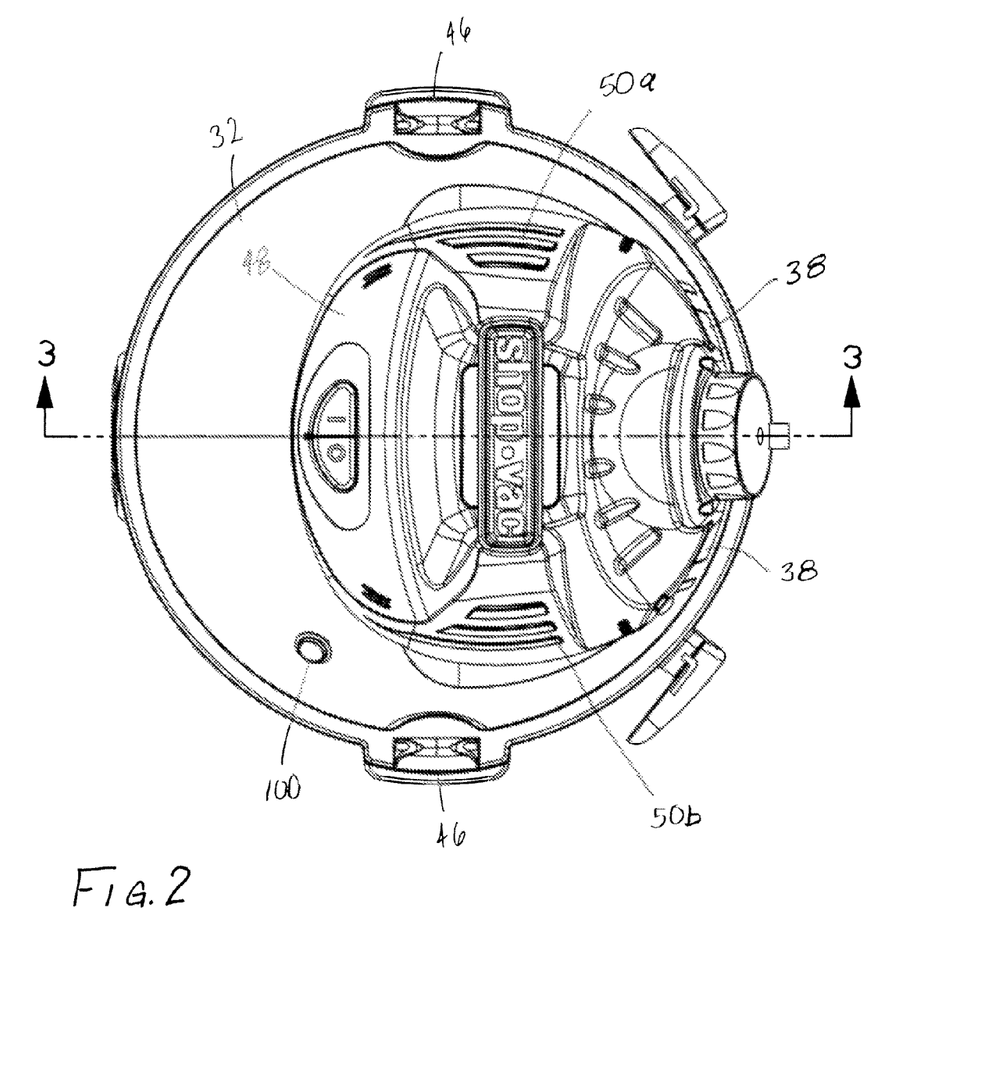
FIG. 2 is a top view of the vacuum.
Figure 3:
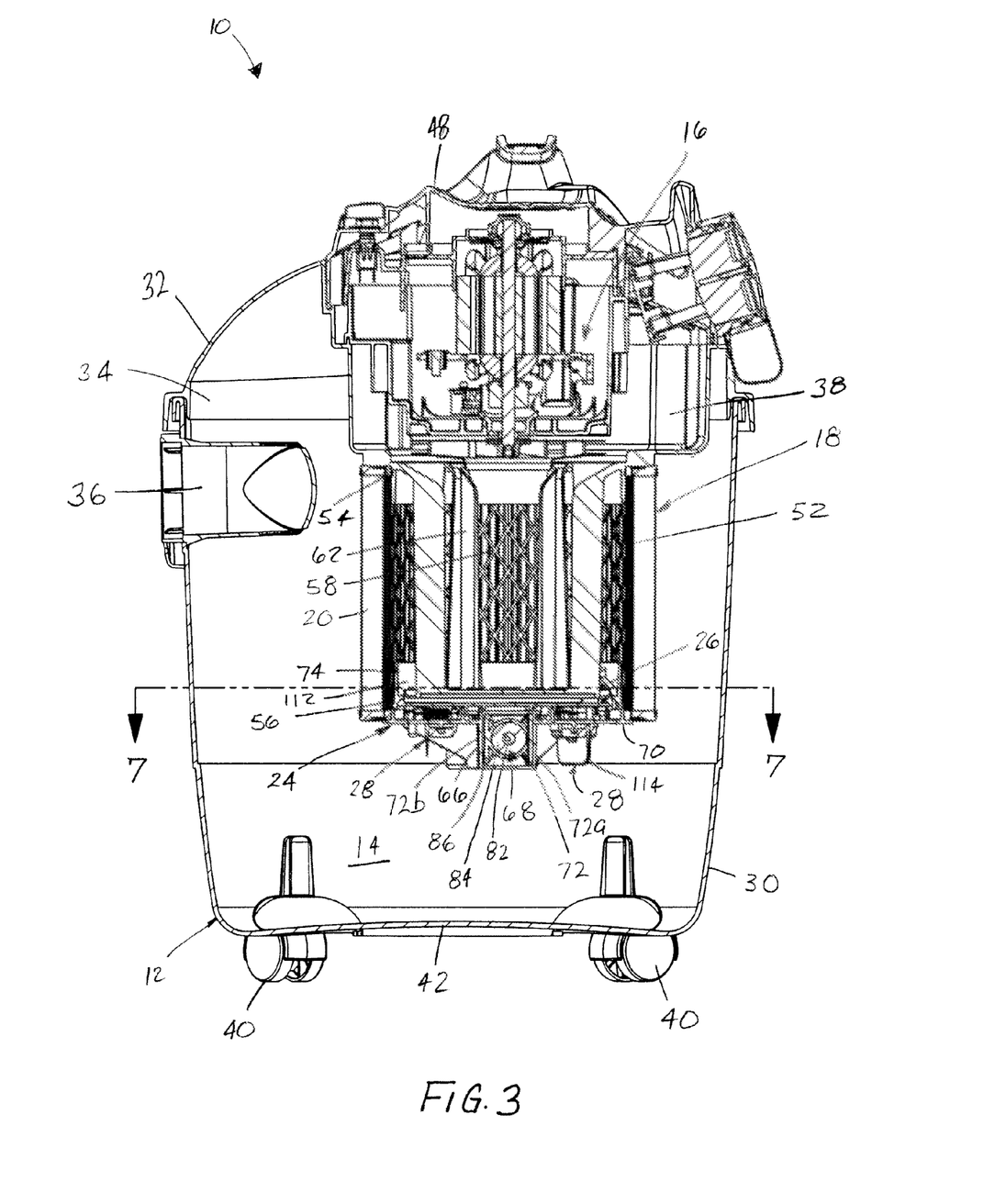
FIG. 3 is a cross-sectional view of the vacuum along the lines 3-3 of FIG. 2 with the filter shaker disposed in an operative position as part of the filter assembly.
Figure 4:
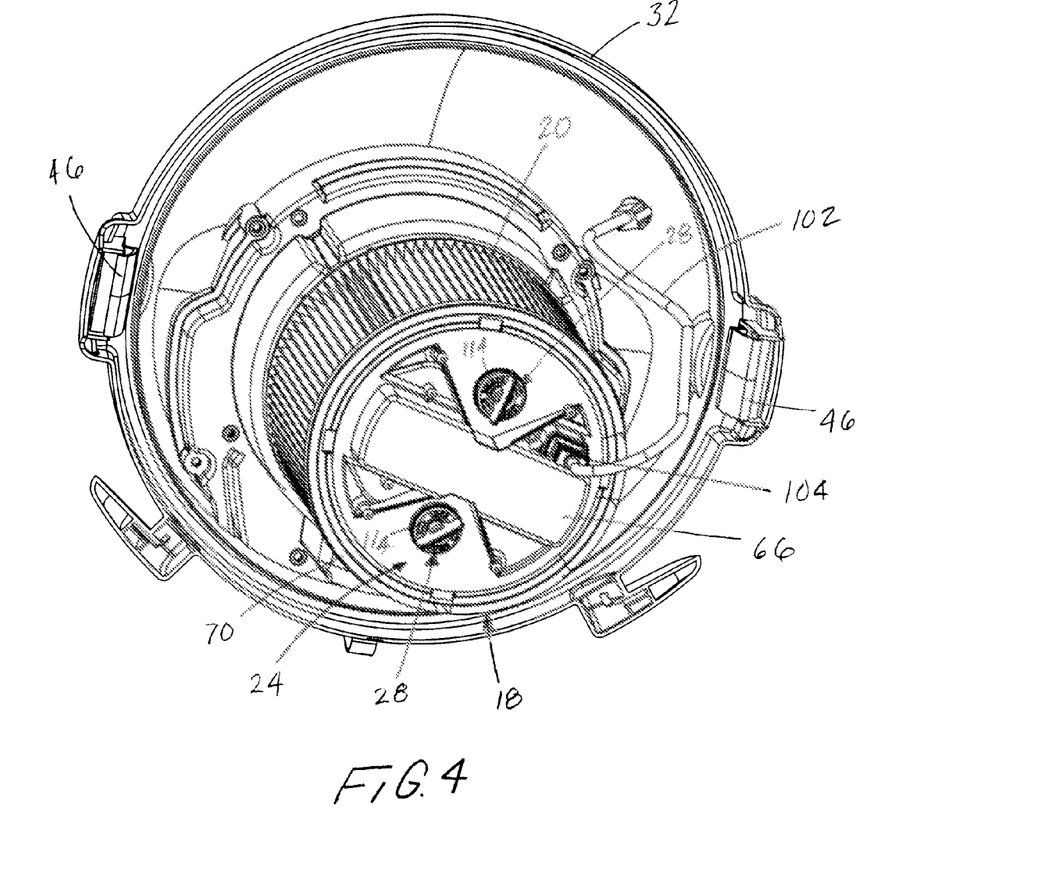
FIG. 4 is a bottom view of the filter assembly in the operative position.

The air inlet 36 is arranged to allow air to be drawn into the vacuum chamber 14, such as through a side wall of the tank bottom 30. The air outlet 38 is arranged to allow air to be pumped out of the vacuum chamber 14 by the vacuum pump 16, preferably through an upper portion of the vacuum housing 12, such as through the cover 32. The vacuum pump 16 is carried by the vacuum housing 12, such as in or on the cover 32, and arranged to pump air from inside the vacuum chamber 14 through the air outlet 38 to the exterior of the vacuum housing. The vacuum pump 16 may be any suitable air pump, such as fan or impeller driven by an electric motor, as would be understood by one of ordinary skill. When activated, by switching on the electric motor for example, the vacuum pump 16 draws air inside the vacuum chamber 14 out of the vacuum chamber through the filter 20 and the air outlet 38, which simultaneously draws air into the vacuum chamber through the air inlet 36. Preferably, the air inlet 36 is adapted to have an attachment, such as a vacuum hose or nozzle (not shown), attached thereto. The air inlet 36 is spaced from the air outlet 38 inside the vacuum chamber such that solids and/or liquids drawn into the vacuum chamber 14 through the air inlet tend to settle onto the floor 42 or at the bottom of the vacuum chamber while the air is drawn through the vacuum chamber and out the air outlet 38.

The filter 20 preferably includes a central through-bore 52 extending between an upper opening 54 through a top end and a lower opening 56 through a bottom end, such as an elongate tubular filter with an axis extending from the upper opening 54 to the lower opening 56. The filter 20 may be formed of any filter material suitable for screening particulates, such as dust and debris, from air drawn out of the vacuum chamber 14 through the air outlet 38 and/or the vacuum pump 16. In a preferred arrangement, the filter 20 is in a cylindrical form having a pleated paper or fabric filter wall arranged in a cylindrical wall, which is supported by a porous frame 58, such as a metal or plastic grid, extending between opposite circular frame ends 60, such as end rings. In other arrangements, the filter 20 may have a sealed or otherwise covered bottom end.

The cage 22 is arranged to hold the filter 20 in the operative position elevated above the floor 42 of the vacuum chamber 14 and surrounding the air 38 outlet so that substantially all air drawn through the air outlet first passes through the filter. The cage 22 includes a plurality of arms 62 that hang downwardly from the cover 32 surrounding the air outlet 38, such spaced apart in a circle. The arms 62 support a plurality of hooks 64 or ledges at the distal, bottom ends thereof. Each hook 64 spans the space between the distal ends of adjacent pairs of the arms 62. The arms 62 define an open air way, such as a cylindrical bore, extending from the air outlet 38 to the hooks. The arms 62 are optionally resilient so that the filter 20 may be installed onto the cage 22 by sliding over the distal ends of the arms 62 and around the hooks 64 and may be removed from the cage by sliding off the distal ends of the arms over the hooks. When the filter 20 is installed in the operative position on the cage 22, the filter surrounds the arms 62 and forms a central airway that extends from the open bottom end 56 of the filter and the cage up through the cylindrical bore to the air outlet 38.

Figures 5, 6:
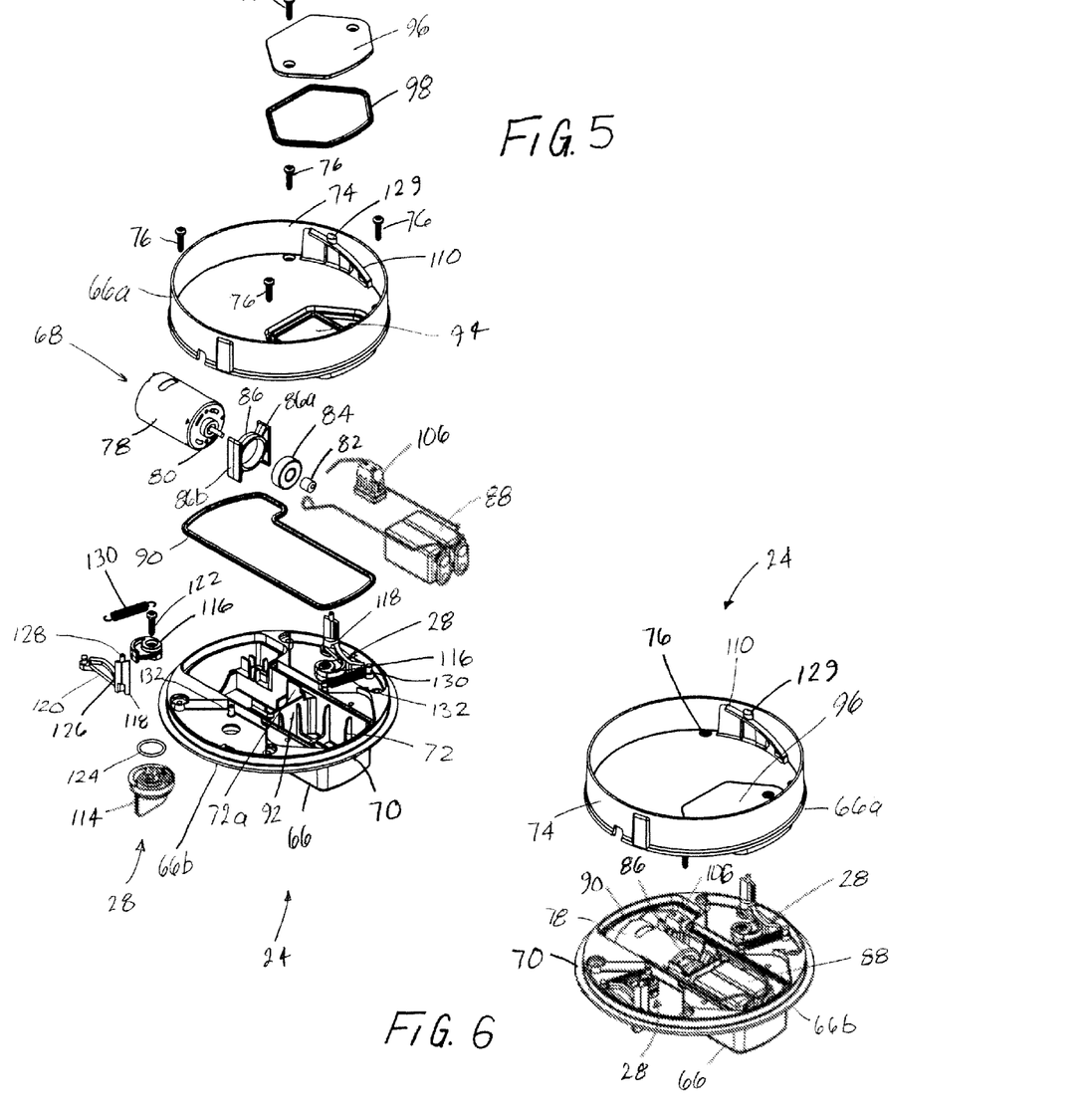
FIG. 5 is an exploded isometric view of the filter shaker.
FIG. 6 is an isometric view of the filter shaker partially assembled.

As best seen in FIGS. 3-6, the filter shaker 24 includes a housing 66, a vibrator assembly 68 carried by the housing, and the mounting assembly 26 disposed on an outer surface of the housing. The mounting assembly 26 is arranged to attach the housing 66 to the cage 22 and/or the filter 20 and cover the open bottom end 56 of the filter. The housing 66 preferably is sized and shaped to cover the open bottom end 56, for example with a flange plate 70 in the form of a circular plate with a diameter at least as large as the open bottom end 56. Preferably, the housing 66 completely blocks the open bottom end 56 to prevent air from entering the central through-bore 52, and the filter 20 engages against the cover 32, optionally forming a seal therewith, so that substantially all air pulled through the air outlet 38 must first pass through the filter material and thereby filter particulate matter from the air before entering the air outlet. In other arrangements, for example where the filter 20 has a sealed or covered bottom end, such as an end cap (not shown) that is attached to the frame 58 and covers the lower opening 56, the mounting assembly 26 may be arranged to releasably attach the filter shaker 24 to the filter 20, the frame 58, and/or the end cap with, for example, one or more hooks carried by resilient arms and arranged to releasably snap to an outer peripheral edge of the end cap, clamps, screws, hook and loop fasteners, or other selectively releasable fasteners. Preferably, in such arrangement, the filter shaker mounts across the end of the filter As best seen in FIGS. 5 and 6, the housing 66 of the exemplary arrangement includes an upper housing 66a connected to a lower housing 66b that, together, define an enclosed compartment 72 that carries the vibrator assembly 68. The lower housing 66b has a circular bottom plate surrounding a well, which defines a lower portion of the enclosed compartment, extending below the bottom plate. The upper housing 66a has a circular top plate that defines a cover for the enclosed compartment and a circumferential wall 74 extending upwardly from a top side of the top plate adjacent the outer periphery of the top plate, preferably spaced inwardly from the outer annular edge of the top plate. When the upper and lower housings 66a, 66b are connected as shown, the circumferential wall 74 extends upwardly away from the flange plate 70 and preferably has a top edge that extends in a circle near the peripheral edge of the flange plate 70. The enclosed compartment 72 is disposed underneath or on a bottom side of the flange plate 70. The top plate and the bottom plate are secured together, for example, with screws 76, other fasteners, welds, and/or adhesives. The upper housing 66a forms a removable cap to cover the lower opening 56 and removably attach to the filter 20 and/or the cage 22, and the lower housing 66b and the vibrator assembly 68 form a filter shaker that is connected to the removable cap with connectors in the form of the screws 76.

The vibrator assembly 68 includes an electric motor 78 having a motor shaft 80, an eccentric 82 connected to the motor shaft, an actuator 86 connected to the eccentric with, for example, an eccentric bearing 84, and optionally a power source 88, such as one or more batteries, operatively connected to the motor to power the motor. The vibrator assembly 68 is disposed inside the enclosed compartment 72, and the actuator 86 is arranged such that rotation of the motor shaft 80, by powering the motor with the power source 88, for example, causes the actuator to periodically impact one or more portions of the housing 66, such as opposing side walls 72a, 72b of the enclosed compartment 72. Preferably, the actuator 86 is arranged to impart only lateral impact forces (in relation to the axis of the filter 20) and not axial impact forces, by for example, being arranged to impact only the side walls 72a, 72b and not impact a bottom wall or top wall of the enclosed compartment 72. Thus, the actuator 86 includes first and second hammers 86a, 86b on opposite lateral sides of a ring carried by the eccentric bearing 84, wherein the hammers 86a, 86b are arranged to alternatingly impact the opposing lateral side walls 72a, 72b of the enclosed compartment 72. The motor 78 is preferably secured by a flexible mount inside the enclosed compartment with, for example, one or more flexible mounting brackets. In this arrangement, the motor 78 is also able to move to vibrate the filter shaker 24 by, for example, striking against one or more walls of the enclosed compartment 72 at the same time the motor drives the actuator 86.

The power source 88 for the motor may be any electrical source sufficient to drive the motor. Preferably, the power source 88 is direct current provided by, for example, one or more 9-volt batteries. The batteries preferably are carried by the housing inside the enclosed compartment. In other arrangements, power may be provided to the motor by alternating current, for example, supplied from the same power source that powers the vacuum pump, such as standard household electric supply.

The enclosed compartment 72 is optionally water tight and includes a seal, such as a gasket 90, disposed between the top plate and the bottom plate and surrounding the well. Further, the well is optionally divided into one or more compartments, such as a motor compartment that is adapted to receive the motor, an actuator compartment that is adapted to receive the actuator, and a battery compartment that is adapted to receive the batteries. The battery compartment is preferably separated from the motor and actuator compartments by a wall 92, and the top plate optionally includes a battery access opening 94 over the battery compartment to allow the batteries to be inserted, removed, and/or replaced without opening the entire enclosed compartment. A separate battery cover 96 is arranged to cover the battery access opening 94, and a seal, such as a gasket 98, seals the battery access opening. The battery access opening 94 is removably attached to the top plate of the upper housing 66a with fasteners, such as screws 76, such that the battery cover 96 may be periodically opened and resealed, for example, to replace the batteries.

The vibrator assembly 68 is turned on and/or off with a switch 100, such as a rocker switch, a toggle switch, a radio frequency switch, and/or an infrared switch, that is preferably located remote from the filter shaker 24 to be easily accessible by a user, such as on an exterior of the vacuum housing, without requiring the vacuum housing 12 to be opened to actuate the switch. In the exemplary arrangement of the drawings, the switch 100 includes a rocker switch located on an exterior of the cover, a chord 102 extending into the vacuum chamber 14, and a plug 104 at the end of the chord. A relay switch 106, such as a receptacle having a socket for operatively receiving the plug 104 and transmitting switching signals to either power on and/or power off the motor 78, is also optionally disposed inside the enclosed compartment 72, such as inside the motor compartment, for example, as best seen in FIG. 5. The plug 104 is arranged to be releasably plugged into the socket and thereby connect the switch 100 to the relay switch 106. In this arrangement, the filter shaker 24 may be selectively disconnected from the switch 100, which for example allows the filter shaker to be removed from the vacuum chamber 14 while using the vacuum 10 or changing the filter 20 if desired. Other remote switching assemblies may also or alternatively be used, such as a wireless switching device including a radio frequency or infrared frequency transmitter/receiver pair as would be understood in the art.

The mounting assembly 26 includes a connector 110 that allows the filter shaker 24 to be releasably attached to the filter 20 and/or the cage 22. The connector 110 may be carried by any portion of the housing 66 that can be arranged to releasably secure the vibrator assembly 68 with the filter 20 and/or the cage 22. In the depicted arrangement, the connector is carried by the circumferential wall 74 of the upper housing 66a and arranged to releasably mount the upper housing and the entire filter shaker 24 to the cage 22 in the operative position, such as by a friction fit, an interference fit, a bayonet connection, or a threaded connection. The circumferential wall 74 is arranged to be inserted into an annular gap 112 at the lower end of the filter 20 between the outer annular periphery of the arms 62 and hooks 64 and the inner diameter of the filter 20. The connector 110 is disposed on the circumferential wall 74 and includes, for example, a pair of ramps (only one visible) disposed on a radially inner surface of the circumferential wall 74. Each ramp includes an inclined wall segment, such as a helical wall extending between opposite upper and lower ends, that projects radially inwardly from the peripheral wall 74. The ramps are arranged to slide over a ledge projecting radially outwardly from the cage 22, such as one or more of the hooks 64, whereby the filter shaker 24 may be mounted to the cage by inserting the circumferential wall 74 axially into the annular gap 112 and rotating the housing 66 about the axis of the cage and the filter 20, such as in a clockwise direction, to releasably engage the ramps over one or more of the hooks 64. One or more detents may be arranged to provide a snap-fit or other resilient locking mechanism between, for example, the circumferential wall 74 or the ramps and one or more of the adjacent arms 62 or hooks 64. However, other releasable mounting assemblies and/or connector arrangements, such as a threaded connection or bayonet connection, may be provided, and the disclosure is not intended to be limited to the exemplary mounting assembly and/or connector shown in the drawings.

The filter shaker includes two locking assemblies 28 carried by the housing 66, wherein each locking assembly is adapted to lockingly engage and disengage the cage 22 and/or the filter 20, as selected by a user, to prevent the filter shaker 24 from vibrating off of the cage while the vibrator assembly is activated. In the exemplary arrangement of the drawings, each locking assembly 28 includes a knob 114 arranged for turning by a user, a cam 116 arranged to be turned in response to turning of the knob, and a lock 118 having a cam follower 120 engaged with the cam. For brevity, only one locking assembly is described in detail, it being understood that each locking assembly is functionally identical. The knob 114 is disposed on the bottom side of the flange plate 70, preferably spaced from the well a space sufficient to allow easy manipulation by a user's fingers. The cam 116 is disposed in a cavity defined between the bottom plate and the top plate inside the flange plate and is connected to the knob 114 for rotation with the knob by, for example, a shaft or screw 122 that extends through an aperture in the bottom plate and connects the cam with the knob. A seal, such as an O-ring 124, is preferably secured around the aperture and arranged to seal the aperture to prevent water and/or debris from entering the cavity through the aperture. The lock 118 further includes a flap 126, such as an elongate planar wing having an rotational axis, such as defined by a shaft 128. The cam follower 120 is in the form of an arm that extends laterally from the axis defined by the shaft 128 at one end of the flap 126. The lock 118 is rotatably secured to the bottom plate and to an underside of the helical ramp, for example with the shaft 128 rotatably received within a socket 129 defined by the helical ramp and/or in the circumferential wall 74, such that the shaft 128 extends upwardly away from the flange plate 70 and is rotatably secured in an upright position aligned with the circumferential wall 74. The cam follower 120 is disposed within the cavity and engages with the cam 116, whereby the lock 118 is selectively shifted between an unlocked position and a locked position by rotating the knob 114, which thereby rotates the cam and pivots the cam follower 120 and the flap 126.

The locking assembly 28 preferably includes a resilient mechanism, such as a spring 130 connected to an end of the arm distal from the axis 128, which is arranged to automatically pivot the flap 126 to the locked position when the knob 114 is rotated in a locking direction. The spring 130 preferably is disposed inside the cavity and connected to a the housing 66, for example at a spring post 132, at one end and to the distal end of the cam follower 120 at the opposite end, and arranged to be stretched a maximum when the lock 118 is in the unlocked position and to resiliently pull the arm of the cam follower to pivot the flap toward the locked position.

Figure 7:
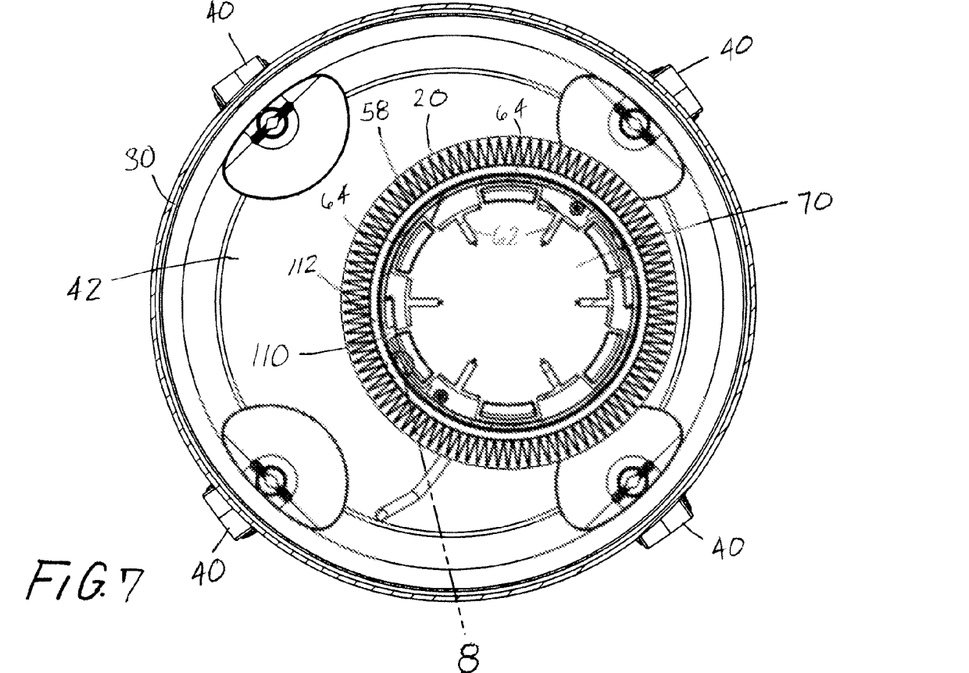
FIG. 7 is a cross-sectional view of the vacuum along the lines 7-7 of FIG. 3 showing the filter assembly in an operative position.
Figure 8:
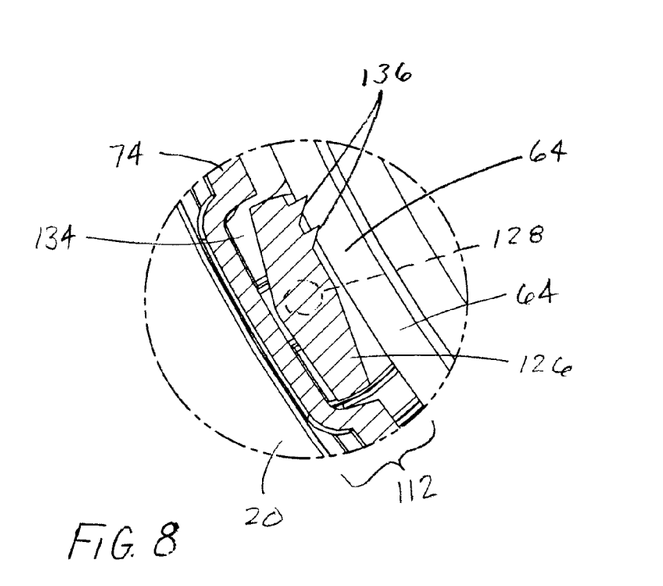
FIG. 8 is an enlarged detail view of the encircled area shown in FIG. 7 showing a lock of the filter shaker in a locked position.

As best seen in FIGS. 7 and 8, the flap 126 is disposed in a break within the circumferential wall 74, such as a recess 134, such that the flap 126, in the unlocked position, is aligned with the circumferential wall, thereby allowing the filter shaker 24 to rotate with respect to the cage 22 and the filter 20. As best seen in FIG. 8, the lock 118 includes one or more teeth 136 disposed on the flap 126 and arranged to engage the cage 20 in a locked position, such as by biting into an outer peripheral surface of one of the hooks 64, so as to prevent rotational movement of the filter shaker 24 when the lock is in the locked position. When the locking assembly 28 is turned to the locked position, the lock 118 pivots on the shaft 128, the flaps 126 rotate out of alignment with the peripheral wall 74, and the teeth 136 engage against the outer peripheral surface of the hook 64. When the locking assembly 28 is turned to the unlocked position, the flaps 126 return into alignment with the peripheral wall 74 thereby disengaging the teeth 136 from the hook 64.

Although the exemplary arrangement of the drawings shows two locking assemblies 28, one or more than two locking assemblies may be provided. In addition, the locking assembly 28 may include additional or alternative locks, as long as the lock or locks are sufficient to prevent the filter shaker from vibrating off of the cage while the vibrator assembly is activated.

The filter shaker 24 may be mounted and demounted from the cage 20 such that the vacuum 10 may be operated with or without the filter shaker. To mount the filter shaker 24 in the operative position as part of the filter assembly 18, the peripheral wall 74 is slid into to the annular space 112 between the filter 20 and the cage 22. The housing 66 is then rotated about the axis of the filter 20 and the cage 22 such that the end of each ramp of the connectors 110 engages over one of the hooks 64. As the housing 66 is rotated, the ramps of the connectors 110 draw the flange plate 70 up tight against the bottom end of the filter 20, thereby covering and substantially sealing the open bottom end 56 with the housing. Thereafter, the locks 118 are engaged by rotating the knobs 114 to prevent the filter shaker 24 from rotating by vibrating off of the cage 22 during use. The switch 100 is connected to the relay switch 106, for example, by inserting the plug 104 into the socket of the relay switch at any convenient time. To demount the filter shaker 24, the above actions may be reversed.

When the filter shaker 24 is mounted in the operative position, the vibrator assembly 68 is actuated by activating the switch 100, which powers the motor 78 and rotates the eccentric 82 and the actuator 86 in an eccentric path. The actuator 86 periodically impacts laterally (with respect to the axis of the filter) against the side walls of the actuator compartment 72, thereby causing vibrations that are directed laterally to the axis of the filter 20, and the motor 78 also vibrates at the same time thereby adding to the overall vibration of the housing 66. Optionally, the speed of the motor 78 is preferably set such that the actuator vibrates very quickly, such as at 10 Hz, 100 Hz, 500 Hz, or more. The vibrations from the impacts are transmitted to the filter 20 by engagement between the flange plate 70, the peripheral wall 74, and/or the cage 20, and thereby shake particles, such as dust and debris, off of the filter 20, and unclogging or cleaning the filter.

Preferably, the filter shaker 24 is not activated while the vacuum pump 16 is operating so that debris may more easily fall away from the filter 20 when the filter shaker 24 vibrates. Therefore, the vacuum 10 and/or the filter shaker 24 optionally may include a safety switch arranged to prevent the motor from engaging anytime the vacuum pump is engaged.

The filter shaker 24 may be made of any materials and in any method sufficient to produce the structures disclosed herein. Preferably, the housing 60 and locking assemblies 28 are formed of metal or plastic, for example by injection molding, and assembled in any sufficient manner as would be understood to a person of ordinary skill. The motor 78 and remaining portions of the vacuum 10 may also be constructed in any manner as would be understood by a person of ordinary skill.

INDUSTRIAL APPLICABILITY

In some aspects, the filter shaker 24 disclosed herein is useful for cleaning the filter 20 in the vacuum 10 quicker and more easily than cleaning the filter by hand. The filter shaker 24 may also extend the useful life of a filter 20 because the filter may be cleaned more frequently since the filter shaker is easy to actuate from outside of the vacuum. Further, the filter shaker 24 is a fully self-contained actuatable unit which, for example, can be transferred and/or attached to different filter assemblies and/or vacuums. Therefore, the filter shaker 24 is useful in some arrangements for retrofitting to vacuums and/or filter assemblies that were not originally provided with the filter shaker.

Numerous modifications to the vacuum 10, filter assembly 18, and filter shaker 24 disclosed herein will be apparent to those skilled in the art in view of the foregoing description and the attached drawings. This detailed description is illustrative only of one exemplary arrangement and is presented for the purpose of enabling those skilled in the art to make and use the invention and to teach the preferred mode of carrying out same. The exclusive rights to all modifications within the scope of the appended claims are reserved.

We claim:

1. A filter shaker comprising:
   a motor having a motor shaft that rotates when powered by a power source;
   an eccentric connected to the motor shaft;
   an actuator connected to the eccentric;

a housing that carries the motor, the eccentric, and the actuator, wherein the actuator is arranged to periodically impact at least one portion of the housing when the motor shaft rotates; and a connecter disposed on an outer surface of the housing, the connecter arranged to releasably mount the filter shaker across an end of a filter.

2. The filter shaker of claim 1, wherein the housing comprises an enclosed compartment and a peripheral wall extending outwardly from the enclosed compartment, wherein the motor is disposed in the enclosed compartment, and wherein the connector is disposed on the peripheral wall.

3. The filter shaker of claim 2, wherein the housing further comprises a flange plate, and the peripheral wall extends axially from a first side of the flange plate.

4. The filter shaker of claim 3, further comprising:
a lock carried by the housing, the lock having a flap shiftable in relation to the housing between a locking position and an non-locking position.

5. The filter shaker of claim 4, wherein the filter shaker is attached to a removable cap that includes the connector, and the connecter comprises a ramp disposed on an inner radial surface of the circumferential wall.

6. The filter shaker of claim 5, wherein the flap extends along an axis from the first side of the flange plate to the ramp, wherein the flap is arranged to rotate about the axis between the locking position and the non-locking position, and wherein the flap includes a tooth arranged to rotate about the axis.

7. The filter shaker of claim 6, wherein the lock further comprises:
an actuator knob disposed on a second side of the flange plate opposite the first side, wherein rotation of the actuator knob causes the flap to rotate about the axis.

8. The filter shaker of claim 3, wherein the actuator is arranged to periodically impact opposing surfaces of the housing in a plane transverse to the circumferential wall in response to rotation of the motor shaft.

9. The filter shaker of claim 2, wherein the power source comprises a battery carried by the housing.

10. The filter shaker of claim 9, wherein the battery is disposed inside the enclosed compartment, and wherein the enclosed compartment is water tight and includes an access panel that is removably secured to the housing to cover an access opening into the enclosed compartment, and a seal arranged to provide a water tight seal between the access panel and the housing surrounding the access opening.

11. A vacuum comprising:
a vacuum housing comprising a tank bottom defining a vacuum chamber with a floor and an opening into the vacuum chamber disposed above the floor, a cover arranged to cover the opening, an air inlet into the vacuum chamber, and an air outlet through the cover;
a vacuum pump carried by the vacuum housing and arranged to pump air out of the vacuum chamber through the air outlet;
a filter extending into the vacuum chamber, the filter defining a top end surrounding the air outlet and a bottom end;
a cage carried by the vacuum housing, wherein the cage supports the filter; and
a filter shaker comprising a vibrator assembly carried by a housing and a connector carried by the housing, wherein the filter shaker is releasably secured to the filter and/or the cage with the connector.

12. The vacuum of claim 11, wherein the filter defines a through-bore extending from the bottom end to the top end, and wherein the housing completely covers the through-bore at the bottom end of the filter.

13. The vacuum of claim 12, wherein the connector releasably mounts to the cage, and wherein the filter shaker further comprises a lock arranged to selectively and releasably lock the filter shaker to the filter and/or the cage.

14. The vacuum of claim 13, wherein the cage is disposed inside the through-bore of the filter, and wherein the lock comprises a movable flap that engages the cage and an actuation knob arranged to selectively move the flap from a locked position engaged with the cage and an unlocked position disengaged from the cage.

15. A filter assembly for a vacuum comprising:
an elongate filter defining a through-bore and with an open end;
a cage supporting the filter; and
a filter shaker comprising a motorized vibrator assembly carried by a housing, wherein the housing in a mounted position is releasably secured to the cage and covers the open end.

16. The filter assembly of claim 15, wherein the housing comprises a circumferential wall and a connector, and wherein in the mounted position the circumferential wall fits inside the open end of the filter, the connector secures the filter shaker to the cage, and the housing substantially restricts the opening.

17. The filter assembly of claim 15, wherein the filter shaker further comprises a lock assembly that releasably locks the filter shaker to the cage in the mounted position, the lock assembly comprising:
a flap disposed on a first side of the housing adjacent the filter; and
an knob disposed on a second side of the filter shaker opposite the first side and operatively connected with the flap, wherein the knob rotates the flap between a locked position lockingly engaged with the cage and an unlocked position disengaged from the cage.

18. The filter assembly of claim 15, wherein the cage is disposed inside the through-bore of the filter, wherein the housing comprises a peripheral wall, and wherein the peripheral wall extends into an annular space between the cage and the filter and surrounds the cage.

19. The filter assembly of claim 18, wherein the connector comprises a ramp disposed on an inner radial surface of the circumferential wall, and wherein the ramp slides over a ledge projecting radially outwardly from the cage.

20. The filter assembly of claim 15, wherein the housing defines an enclosed compartment, and the vibrator assembly further comprises:
a motor disposed in the enclosed compartment and connected with a power source, the motor including a rotatable motor shaft;
an eccentric disposed in the enclosed compartment and connected to the motor shaft; and
an actuator disposed in the enclosed compartment and connected to the eccentric;
wherein rotation of the motor shaft causes the actuator to periodically impact against at least one wall of housing.

* * * * *